UNITED STATES PATENT OFFICE.

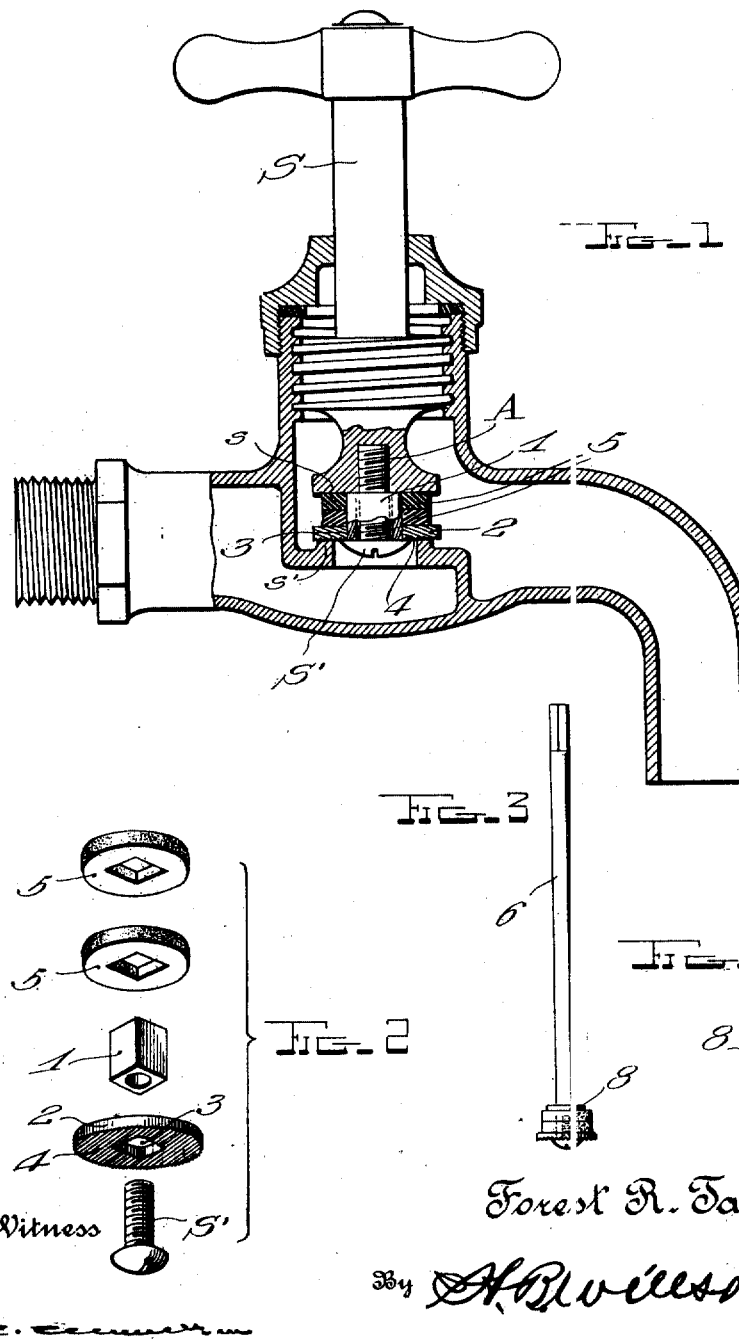

FOREST R. TAYLOR, OF LOWELL, MICHIGAN.

VALVE-RESEATER.

1,223,218.  Specification of Letters Patent.  Patented Apr. 17, 1917.

Application filed August 3, 1916. Serial No. 112,968.

*To all whom it may concern:*

Be it known that I, FOREST R. TAYLOR, a citizen of the United States, residing at Lowell, in the county of Kent and State of Michigan, have invented certain new and useful Improvements in Valve-Reseaters; and I do declare the following to be a full, clear, and exact description of the invention, such as will enable others skilled in the art to which it appertains to make and use the same.

This invention relates to improvements in valve reseating or remilling devices and more particularly to devices of this character for remilling flat valve seats.

The object of the invention is to provide a simple and efficient device of this character which is especially applicable to a faucet valve stem and which is so constructed as to avoid the necessity of using any guides whatever.

Another object of the invention is to so construct a device of this character which will cut absolutely true whether the brace within which it is turned be held exactly true or not.

With the foregoing and other objects in view which will appear as the description proceeds, the invention resides in the combination and arrangement of parts and in the details of construction hereinafter described and claimed, it being understood that changes in the precise embodiment of the invention herein disclosed may be made with the scope of what is claimed without departing from the spirit of the invention.

In the accompanying drawings:

Figure 1 represents a vertical section of an ordinary water faucet with this improved reseating device applied and shown in elevation, parts being broken out and in section;

Fig. 2 is a detail perspective view of the parts constituting the reseater arranged in juxtaposition ready for assembling;

Fig. 3 is a front view of the reseater shown mounted on an auxiliary stem;

Fig. 4 is an enlarged detail section of the device shown in Fig. 3.

In the embodiment illustrated, the reseater constituting this invention is shown applied to a faucet valve of ordinary construction, the stem S of which has the usual annular shoulder or stop $s$ at its inner valve carrying end and equipped with a centrally threaded aperture A to receive the valve retaining screw S'.

The reseater comprises a sleeve 1 the perimeter of which is of angular conformation being here shown square. This sleeve fits loosely on the screw S' and is designed to receive a cutting disk 2, the opening 3 of which conforms in shape and size to the perimeter of the sleeve fitting over said sleeve and being held in rigid relation thereto. The outer face of this disk is serrated as shown at 4, said serrated face being designed for engaging and re-milling the valve seat shown at $s'$.

A plurality of elastic washers 5 having openings therein conforming in shape and size to the perimeter of the sleeve are designed to be mounted on the sleeve between the inner face of the cutting disk 2 and the flat apertured end of the valve stem S. Any desired number of these washers may be employed, two being here shown and they may be constructed of any suitable material, preferably of soft rubber and operate to form a yielding connection between the disk and stop which insures the true cutting of the seat.

In the use of this invention, when a valve seat becomes pitted or rough thereby causing the valve to leak, the reseater is attached to the stem S by first removing the screw S' and detaching the valve, not shown, and which is usually held in place by this screw. The reseater is applied by placing the sleeve 1 on the screw S' and then mounting on this sleeve the cutting disk 2 and the elastic washers 5. The valve stem is then secured in place as shown in Fig. 1 and the cutting is accomplished by screwing up and unscrewing the stem S one-half turn, the same as when turning on and off the water. A dozen or so turns or oscillations is usually sufficient to produce a bright new seat true with the stem. The remilling device being attached to the stem of the valve must necessarily cut true and this produces a more perfect valve seat than could be made except with a very expensive and complicated machine.

When it is desired to use this reseater in connection with a globe or odd-shaped valve in which the stem is not removable, the cutting disk is attached to the end of a steel shank or stem 6 which has a threaded socket 6' in its end to receive screw S'. This stem 6 is designed to be inserted in an ordinary brace (not shown) and the remilling is accomplished in the manner above described.

A steel washer 8 is preferably carried by the stem 6 being clamped between the end of said stem and the sleeve 1 as shown clearly in Fig. 4.

The rubber washers employed form a yielding connection which permits the cutting disk to cut true on the valve seat even though the brace with which it is turned be not exactly true. The angle of remilling being regulated by the shape of the valve seat will cut true unless the valve is in a very bad state.

I claim:

1. The combination with a stem provided at one end with a stop and having a central threaded aperture, and a securing screw for insertion into said aperture; of a sleeve loosely mounted on said screw, a cutting disk carried by said sleeve and held against turning relatively thereto, and an elastic washer also carried by said sleeve between said disk and stop and held against turning thereon.

2. The combination with a stem provided at one end with an annular shoulder and having a central threaded aperture, and a securing screw for insertion into said aperture; of a sleeve loosely mounted on said screw and having an angular perimeter, a cutting disk having an aperture conforming in shape to the perimeter of said sleeve, and an elastic washer having the opening therein conforming in shape to the perimeter of said sleeve and disposed between said shoulder and disk.

In testimony whereof I have hereunto set my hand in the presence of two subscribing witnesses.

FOREST R. TAYLOR.

Witnesses:
R. E. SPRINGETT,
FRANCES LEONARD.

Copies of this patent may be obtained for five cents each, by addressing the "Commissioner of Patents, Washington, D. C."